Oct. 1, 1929.  W. B. TIMMS  1,729,655
LOST MOTION TAKE-UP AND CENTERING INSTALLATION
Filed April 21, 1927
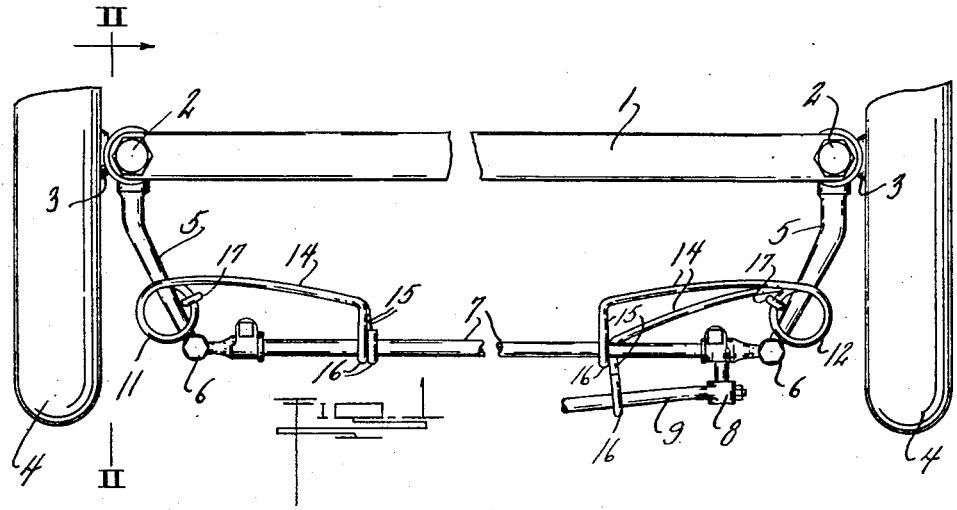
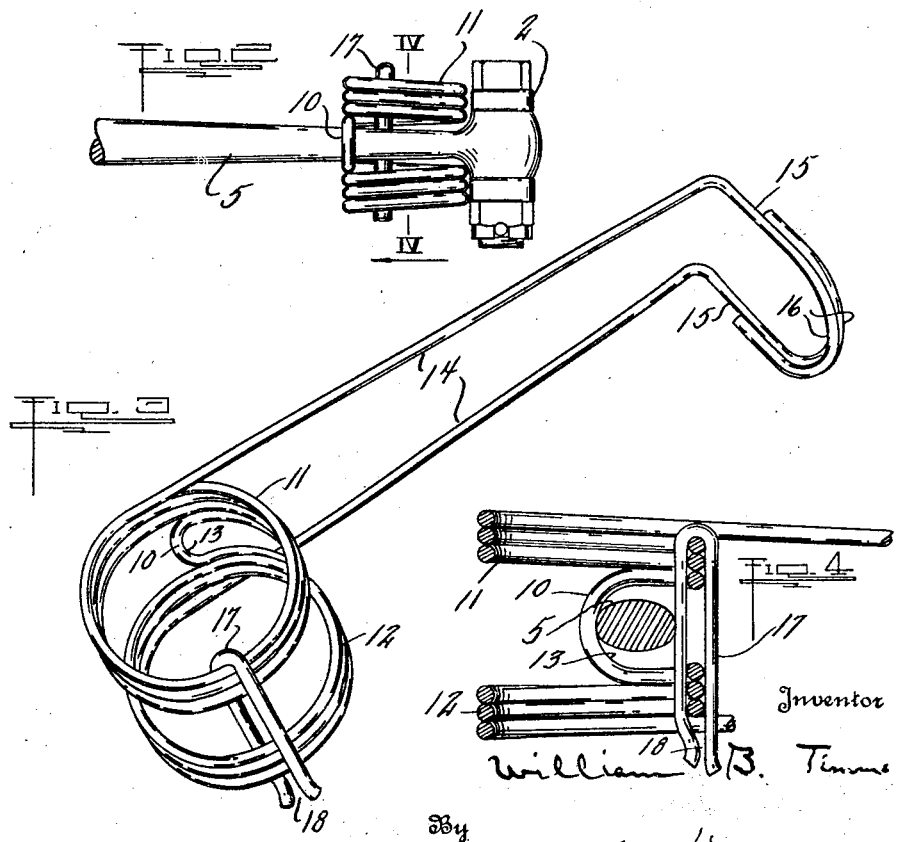
Inventor
William B. Timms
By Geo E Kirk
Attorney Patented Oct. 1, 1929

1,729,655

UNITED STATES PATENT OFFICE

WILLIAM B. TIMMS, OF ELYRIA, OHIO, ASSIGNOR OF ONE-HALF TO HOWARD S. CANFIELD, OF TOLEDO, OHIO

LOST-MOTION TAKE-UP AND CENTERING INSTALLATION

Application filed April 21, 1927. Serial No. 185,472.

This invention relates to take up devices as supplemental yielding and holding means adjacent joints for relatively movable members.

This invention has utility when incorporated in conjunction with steering mechanism joints of motor vehicles.

Referring to the drawings:

Fig. 1 is a plan view, with parts broken away, of an embodiment of the invention in connection with the steering wheels of an automobile;

Fig. 2 is a partial view on the line II—II, Fig. 1;

Fig. 3 is a perspective view of one of the springs of the installation; and

Fig. 4 is a section on the line IV—IV, Fig. 2.

Front axle 1 is shown as having pivot joints 2 mounting steering knuckles having wheel carrying arms 3 mounting ground wheels 4. Each steering knuckle has rigid with the wheel carrying arm 3 steering knuckle arm 5 extending to joint 6. The joints 6 of the two arms 5 are connected by steering link 7. This steering link 7 has offset therefrom joint 8 for steering arm 9.

The spring of the invention herein is shown as having intermediate fork 10 from which oppositely extend coils 11, 12, having return bend 13 therebetween, as the form of this intermediate portion of the spring while at the fork 10. The coils 11, 12, have extending from their ends, remote from the fork, extensions 14, terminating in offsets 15 having hooks 16.

In assembly of this torsion spring device, the fork 10 may be disposed to have the coils 11, 12, upon opposite sides of a steering knuckle arm 5 with the return bend 13 of the fork 10 abutting one side of the arm 5. To hold this device against casual shifting as well as increase the torsion action of the coils 11, 12, clip 17 may be thrust over the wraps of the coils 11, 12, and have its restricted opening 18 retain this clip 17 against casual removal. This position of the clip 17 is preferably opposite the return bend 13 of the fork, thereby providing an embracing of the steering knuckle 5 along such arm 5 spaced from the joint 6 in so far as abutting portions movable relatively to the arm 5. As so disposed with the extensions 14 extending parallel to the axle 1 and the link 7, the offsets 15 may be toward the link 7 with the hooks 16 snapped thereover. As to the spring wherein these hooks 16 are in the region of the steering arm 9, such steering arm 9 may be engaged by say at least one of these hooks. The group of devices in the installation tend to work against each other and thus not only take-up any lost motion to serve as antirattlers, but further coact toward maintaining the straight forward direction of travel for the vehicle and resist wheel vibration or wabbling referred to as "shimmying". This is due not only to the torsion action introduced due to the location of the coils 11, 12, as to the relatively movable link and steering arms, but to a certain drag action of resistance due to the general assembly of these devices as away from the joints but reacting through the joints for stabilizing and directing control of the members therethrough.

What is claimed and it is desired to secure by Letters Patent is:

1. A lost motion take up device comprising a one-piece wire bent at approximately its center to form two arms, said arms being wound into coils and having portions comprising termini extending beyond the coils, and a clip engaging the coils for positioning the device upon the object with which it is to be used.

2. A lost motion take up device comprising a one-piece wire bent at approximately its center to form two arms, said arms being wound into coils and having portions comprising termini extending beyond the coils as arms with offset hook extremities, and a clip engaging the coils for positioning the device upon the object with which it is to be used.

In witness whereof I affix my signature.

WILLIAM B. TIMMS.